(12) United States Patent
Ho (10) Patent No.: US 11,607,793 B2
(45) Date of Patent: Mar. 21, 2023

(54) GARDENING MACHINE

(71) Applicant: Ping-Tzu Ho, Taichung (TW)

(72) Inventor: Ping-Tzu Ho, Taichung (TW)

(*) Notice: Subject to any disclaimer, the term of this patent is extended or adjusted under 35 U.S.C. 154(b) by 131 days.

(21) Appl. No.: 17/030,772

(22) Filed: Sep. 24, 2020

(65) Prior Publication Data

US 2021/0086341 A1 Mar. 25, 2021

(30) Foreign Application Priority Data

Sep. 25, 2019 (TW) ................................ 108134700

(51) Int. Cl.
*B25F 5/02* (2006.01)
*A01D 34/416* (2006.01)
*A01D 34/84* (2006.01)

(52) U.S. Cl.
CPC .............. *B25F 5/02* (2013.01); *A01D 34/416* (2013.01); *A01D 34/84* (2013.01)

(58) Field of Classification Search
CPC ......... A01D 34/416; A01D 34/84; B25F 5/02; A01G 3/085
See application file for complete search history.

(56) References Cited

U.S. PATENT DOCUMENTS

| | | | | |
|---|---|---|---|---|
| 6,823,591 | B2 * | 11/2004 | Kobayashi | F02B 63/02 30/277.4 |
| 10,028,432 | B2 * | 7/2018 | Ifuku | A01D 34/90 |
| 2009/0229131 | A1 * | 9/2009 | Tomiyama | A01D 34/90 30/276 |

FOREIGN PATENT DOCUMENTS

TW M526804 U 8/2016

* cited by examiner

*Primary Examiner* — Daniel Jeremy Leeds
(74) *Attorney, Agent, or Firm* — Muncy, Geissler, Olds & Lowe, P.C.

(57) ABSTRACT

A gardening machine is provided, including a rod portion, a controlling portion, a switch assembly and a locking member. The rod portion has a machine tool head. The switch assembly includes a controlling member, and the controlling member is disposed on the controlling portion and movable to be in a first position or a second position. The locking member is disposed on the controlling portion and movable to be in a locked position or a released position, when the locking member is in the locked position, the controlling member is restricted and positioned in the second position.

7 Claims, 9 Drawing Sheets

GARDENING MACHINE

BACKGROUND OF THE INVENTION

Field of the Invention

The present invention relates to a gardening machine.

Description of the Prior Art

Generally, when doing mowing, plow or other gardening works, a user may us a gardening machine to save manpower. The user holds the gardening machine to use a machine tool head at an end of the gardening machine to mow and plow, this type of gardening machine is disclosed in TWM526804, the gardening machine has a machine too head, a controlling portion and a rod portion which is connected to and between the machine tool head and the controlling portion, when using the gardening machine, the user holds the controlling portion with one hand and presses a controlling member of the controlling portion to control the operation of the machine tool head, s/he grips on a handle of the rod portion with the other hand, and the handle becomes a fulcrum to lift up the machine tool head.

However, when holding the controlling portion, the user needs to use his/her fingers to press the controlling member to operate the machine tool head, and since the controlling member has the trait to revert elastically, the user need to press the controlling member with his/her fingers continuously, so after using the gardening machine for a long period of time, s/he may easily have finger sore. In addition, the user cannot change the position of holding the gardening machine, so his/her other body parts may get sore or even have occupational injuries. Therefore, there is still room for improvement.

The present invention has arisen to mitigate and/or obviate the afore-described disadvantages.

SUMMARY OF THE INVENTION

The major object of the present invention is to provide a gardening machine, a user does not need to press a controlling member which his/her finger continuously to make a machine tool head operate continuously, and the user can change the position of holding the gardening machine to prevent his/her other body parts from getting uncomfortable due to maintaining the same position.

To achieve the above and other objects, a gardening machine is provided, including a rod portion, a controlling portion, a switch assembly and a locking member. The rod portion has a machine tool head. The controlling portion is disposed on the rod portion. The switch assembly includes a controlling member, the controlling member is disposed on the controlling portion and movable to be in a first position or a second position, when the controlling member is in the first position, the controlling member non-actuates the machine tool head, and when the controlling member is in the second position, the controlling member actuates the machine tool head to operate. The locking member is disposed on the controlling portion and movable to be in a locked position or a released position, when the locking member is in the released position, the controlling member is movable toward the first position, and when the locking member is in the locked position, the controlling member is restricted and positioned in the second position.

The present invention will become more obvious from the following description when taken in connection with the accompanying drawings, which show, for purpose of illustrations only, the preferred embodiment(s) in accordance with the present invention.

DETAILED DESCRIPTION OF THE PREFERRED EMBODIMENTS

The present invention will be clearer from the following description when viewed together with the accompanying drawings, which show, for purpose of illustrations only, the preferred embodiment in accordance with the present invention.

Please refer to FIGS. 1 to 10 for a preferred embodiment. A gardening machine includes a rod portion 1, a controlling portion 2, a switch assembly 3 and a locking member 5.

The rod portion 1 has a machine tool head 11, in this embodiment, the machine tool head 11 is a mower head, and in other embodiments, the machine tool head 11 may be a scarifier head or a blender head.

The controlling portion 2 is disposed on the rod portion 1.

The switch assembly 3 includes a controlling member 4, the controlling member 4 is disposed on the controlling portion 2 and movable to be in a first position or a second position, when the controlling member 4 is in the first position, the controlling member 4 non-actuates the machine tool head 11, when the controlling member 4 is in the second position, the controlling member 4 actuates the machine tool head 11 to operate.

Figure 1:
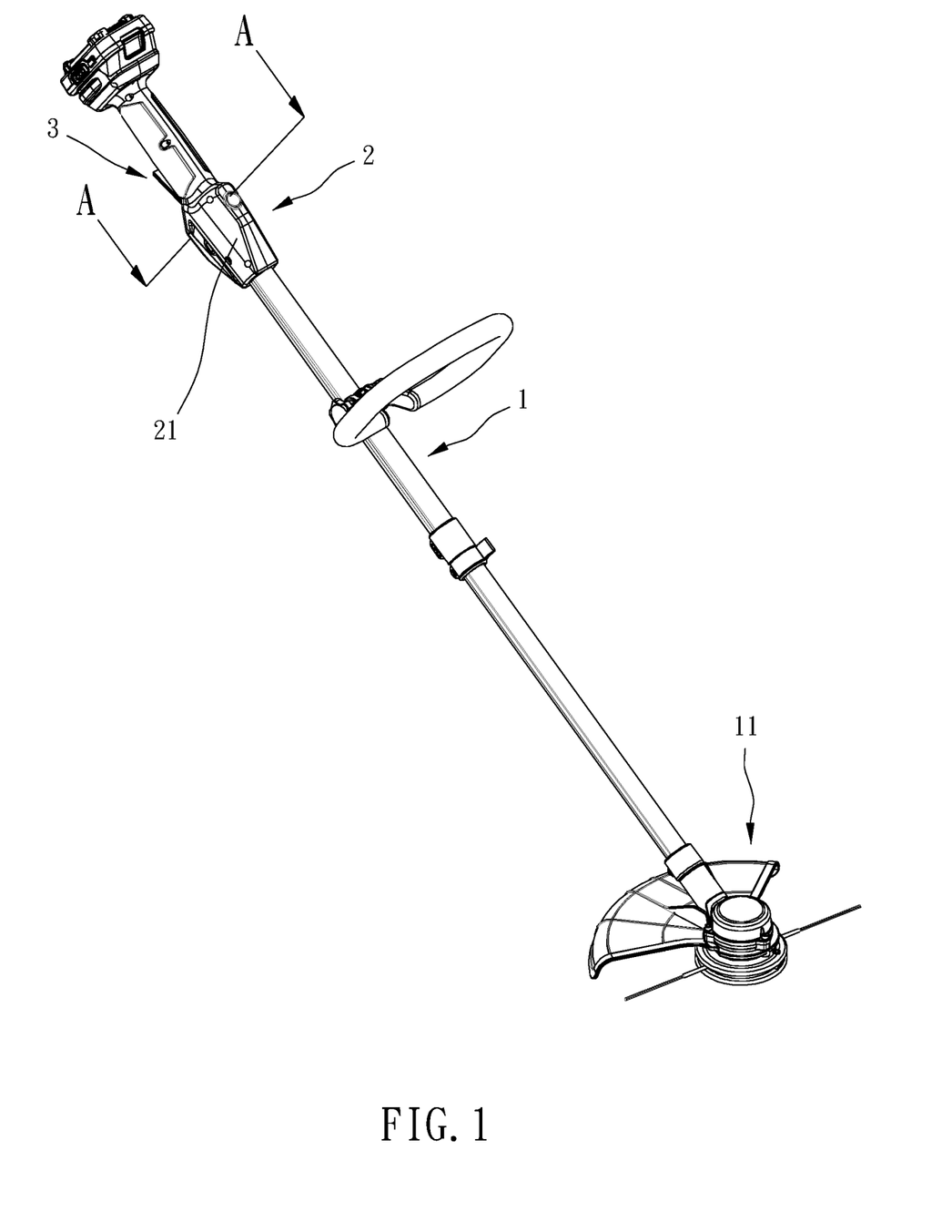
FIG. 1 is a stereogram of a preferred embodiment of the present invention.
Figure 2:
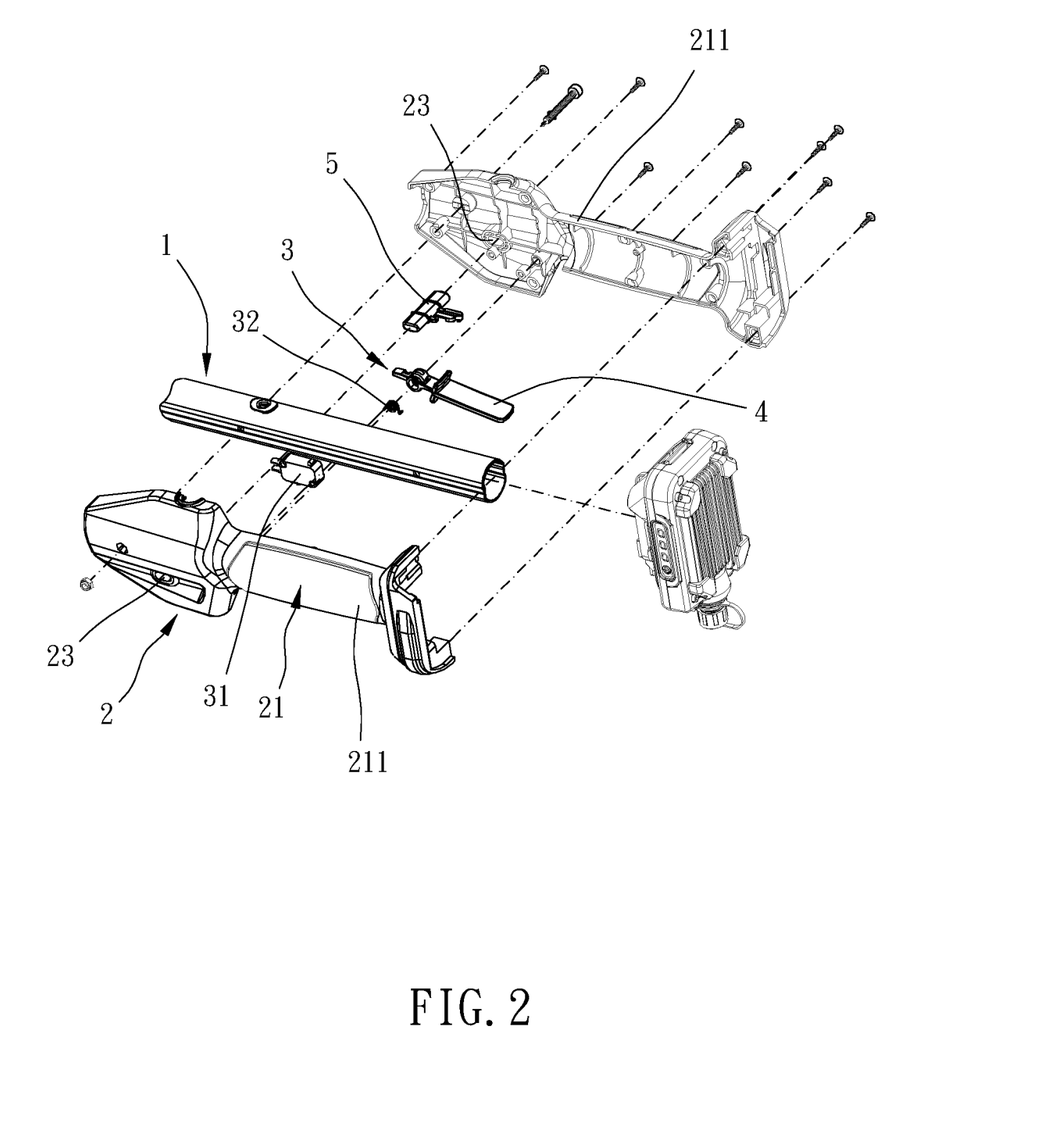
FIGS. 2 and 3 are partially breakdown view of the preferred embodiment of the present invention.
Figure 3:
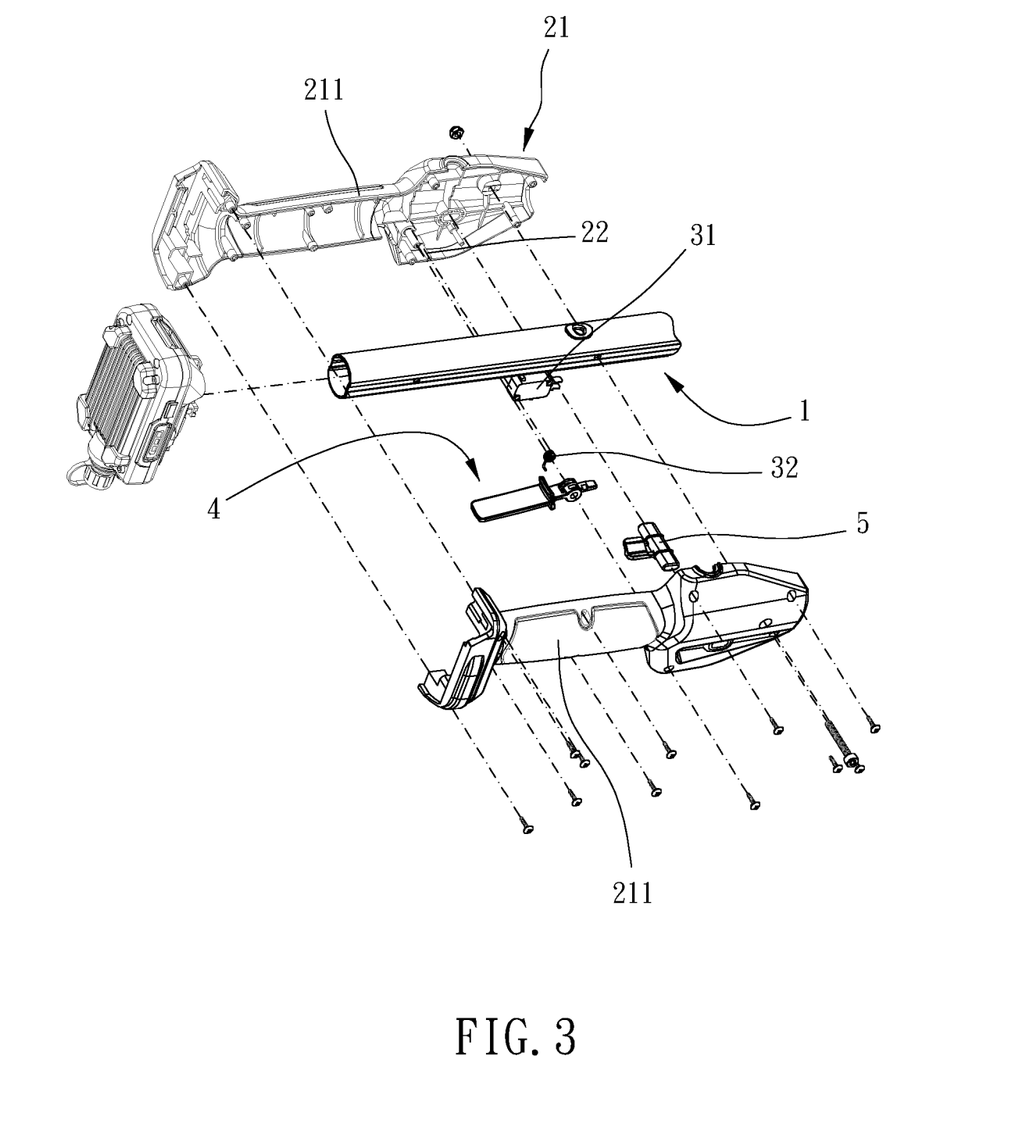
Figure 4:
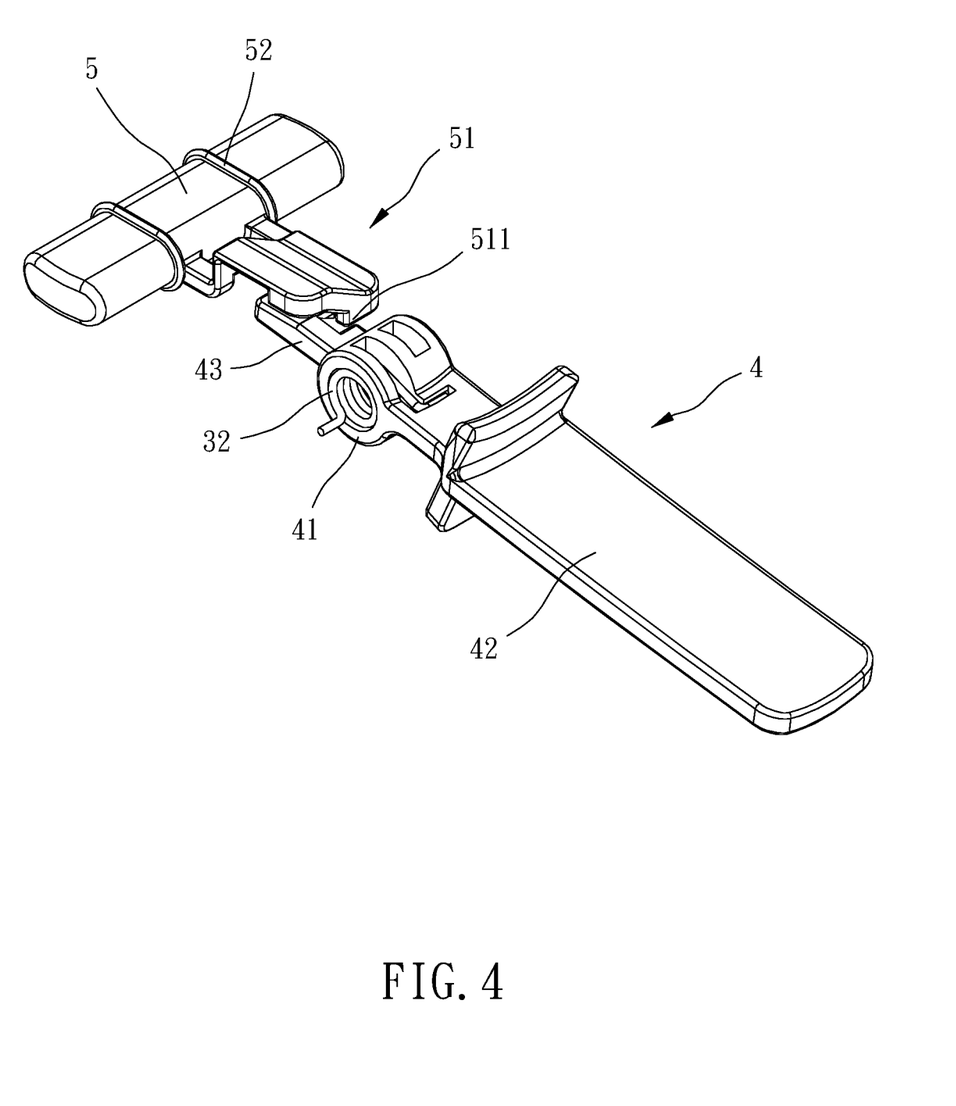
FIGS. 4 and 5 are partial view of the preferred embodiment of the present invention.
Figure 5:
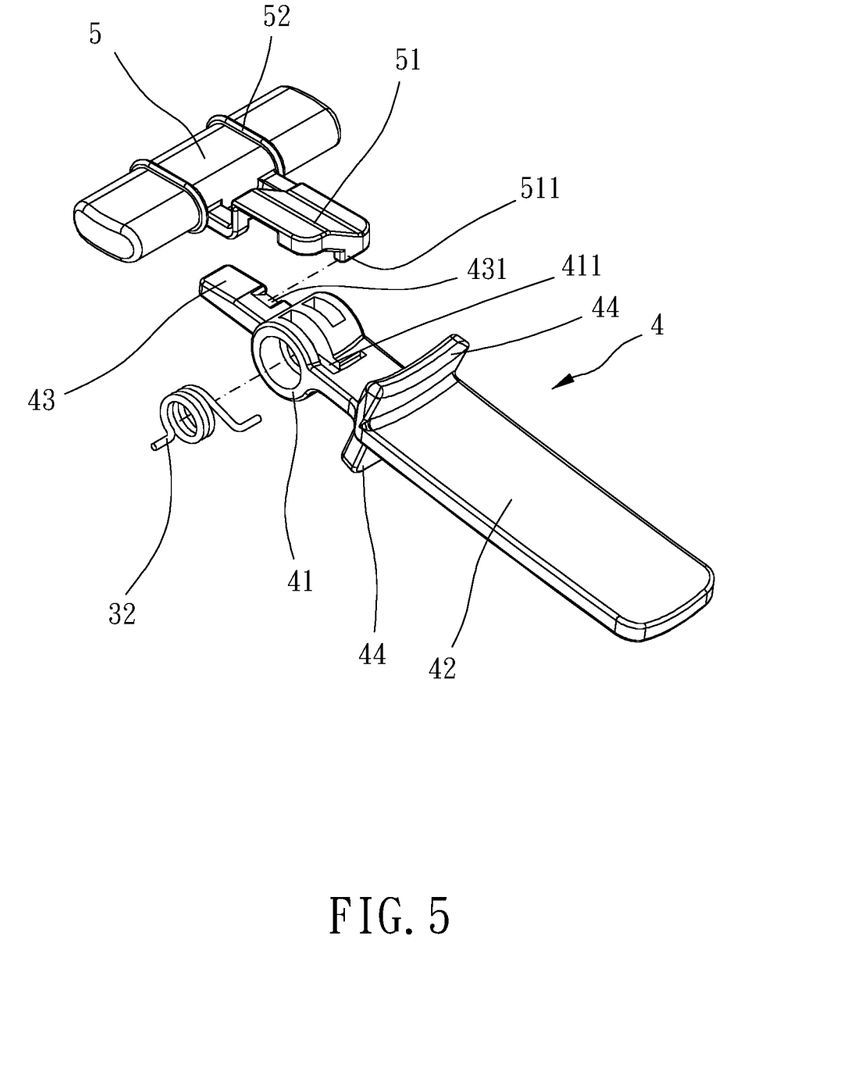
Figure 6:
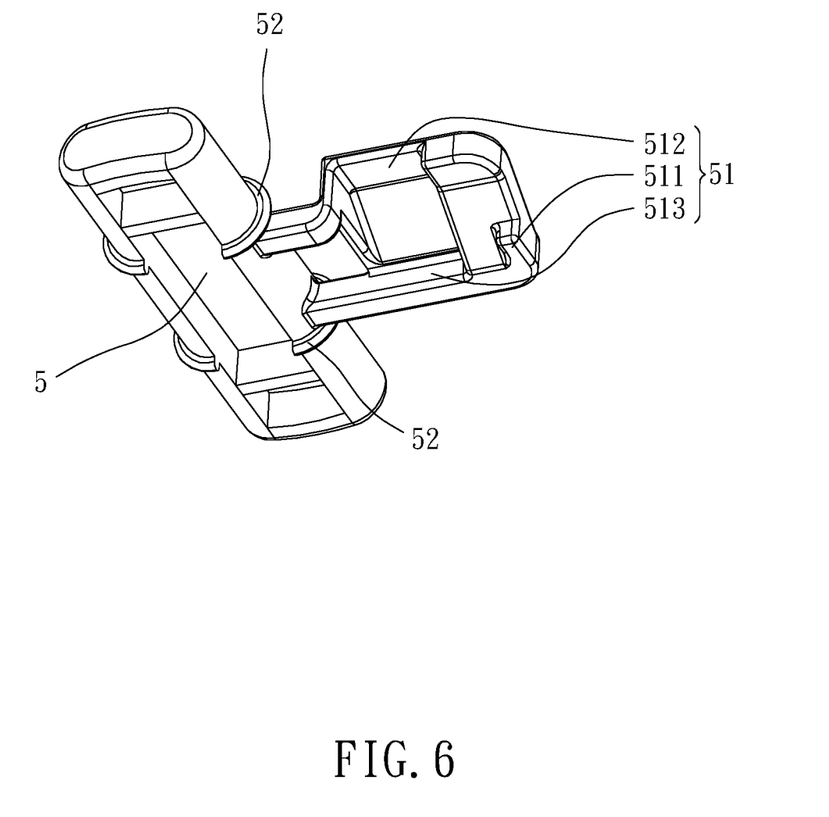
FIG. 6 is a drawing showing a locking member of the preferred embodiment of the present invention.
Figure 7:
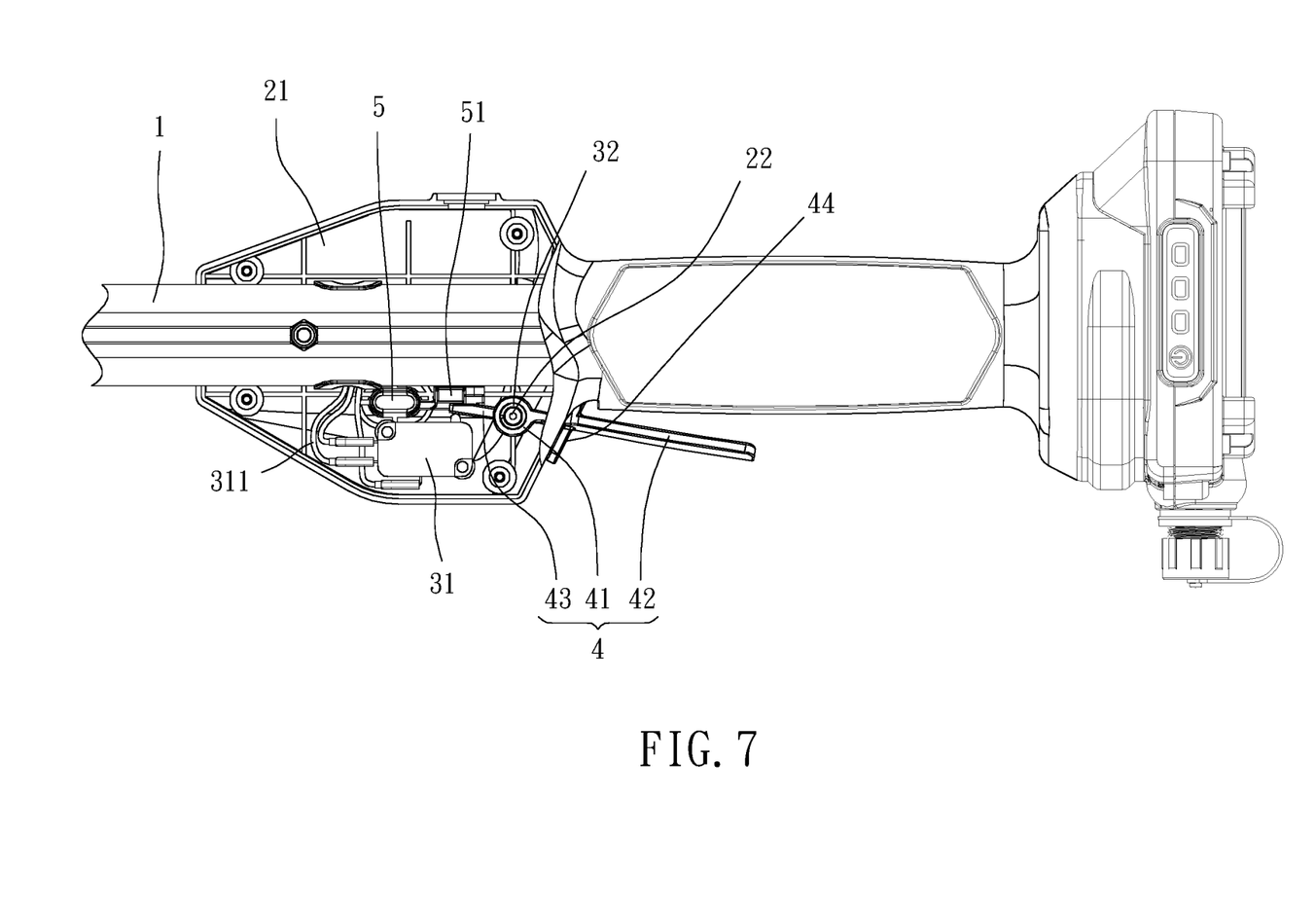
FIGS. 7 and 8 are drawings showing the preferred embodiment of the present invention in operation.
Figure 8:
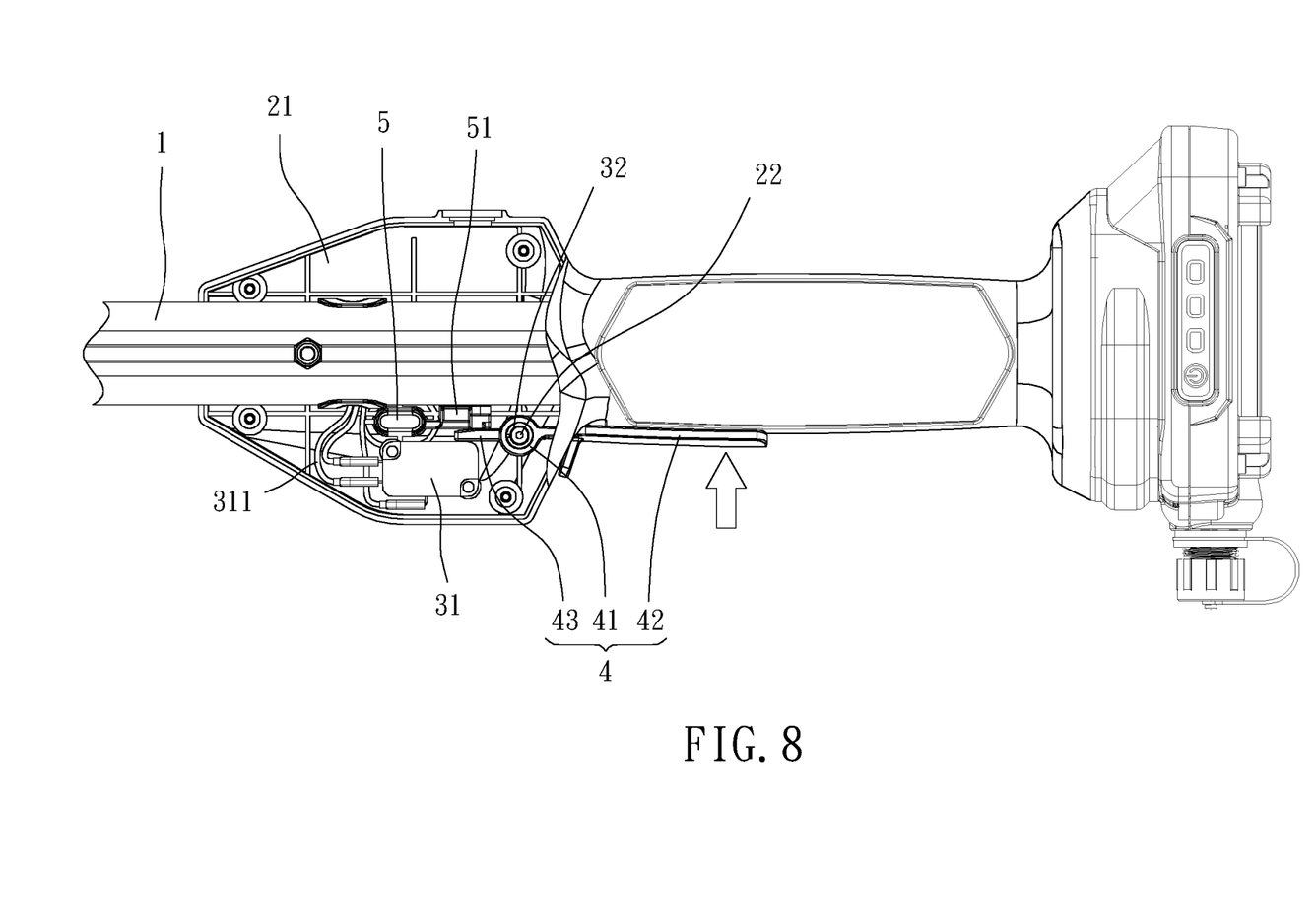
Figure 9:
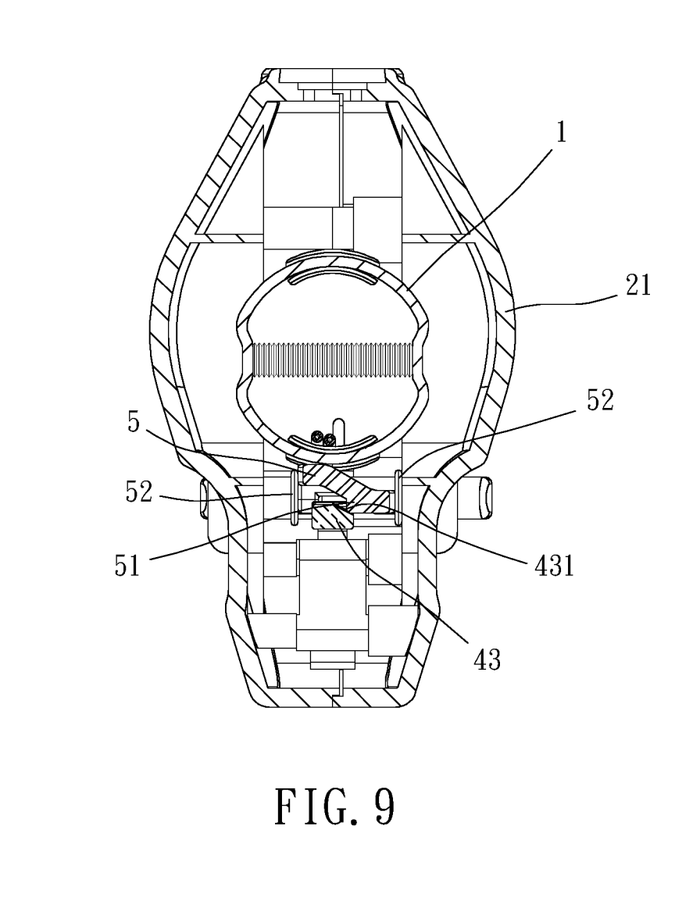
FIGS. 9 and 10 are cross-sectional views showing operation of the preferred embodiment of the present invention, taken in line A-A of FIG. 1.
Figure 10:
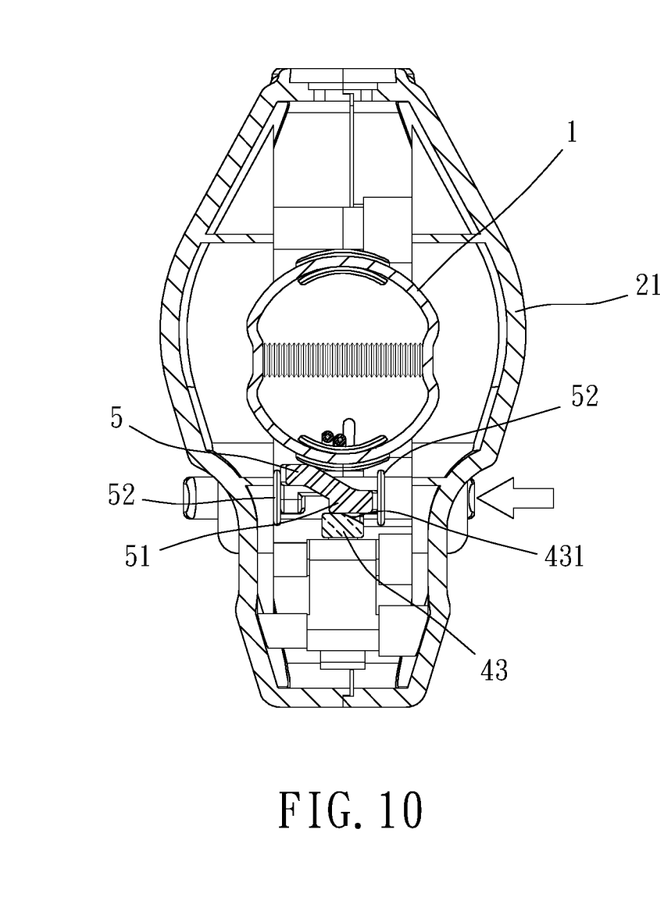

The locking member 5 is disposed on the controlling portion 2 and movable to be in a locked position or a released position, when the locking member 5 is in the released position (as shown in FIG. 9), the controlling member 4 is movable toward the first position, when the locking member 5 is in the locked position (as shown in FIG. 10), the controlling member 4 is restricted and positioned in the second position. Therefore, a user can position the controlling member 4 in the second position via the locking member 5, so that s/he can operate the machine tool head 11 without pressing the controlling member 4 continuously to lessen the burden of his/her fingers and that s/he can change the position of holding the gardening machine to prevent his/her other body parts from getting uncomfortable due to maintaining the same position. In this way, it would be easier for the user to use the gardening machine, and it helps to improve the working efficiency and prevent occupational injury.

Specifically, the controlling member 4 includes a pivot portion 41, the pivot portion 41 is pivoted to a shell body 21 of the controlling portion 2 to allow the controlling member 4 to swing between the first position and the second position. In this embodiment, the controlling member 4 includes a pressing portion 42 and an actuating portion 43, the pivot portion 41 is integrally connected to and between the pressing portion 42 and the actuating portion 43, a part of the pressing portion 42 projects beyond the shell body 21 for fingers to press thereon, the switch assembly 3 further includes a microswitch 31, the microswitch 31 is electrically connected to the machine tool head 11, when the controlling member 4 is in the first position, the actuating portion 43 is non-abutted against the microswitch 31, and when the controlling member 4 swings to the second position, the actuating portion 43 is abutted against the microswitch 31 to trigger the machine tool head 11 to operate. Specifically, in this embodiment, the microswitch 31 is located outside of the rod portion 1 and has at least one wire 311 (in this embodiment, the microswitch 31 has two said wires 311) which enters into the rod portion 1 and is electrically connected to the machine tool head 11.

Preferably, the switch assembly 3 further includes an elastic member 32, and the elastic member 32 is respectively abutted against and between the controlling member 4 and the shell body 21 to make the controlling member 4 have a tendency to swing toward the first position. When the locking member 5 is in the released position, and the user does not press the controlling member 4, the controlling member 4 automatically reverts to the first position to prevent the machine tool head to operate. The pivot portion 41 is sleeve-shaped, the elastic member 32 is a torsion spring and received within the pivot portion 41, the shell body 21 has a shaft 22, and the elastic member 32 and the pivot portion 41 are sleeved on the shaft 22 to rotate relative to the shell body 21. The pivot portion 41 has a slot 411 radially thereon, one of two ends of the elastic member 32 is inserted into the shell body 21, and the other of the two ends of the elastic member 32 radially extends beyond the pivot portion 41 from the slot 411 to be abutted against the controlling member 4 so as to effectively bias the controlling member 4 toward the first position to save the space of receiving the elastic member 32.

In this embodiment, the locking member 5 is slidably disposed on the shell body 21, the locking member 5 has an abutting portion 51, when the locking member 5 is in the locked position, the abutting portion 51 corresponds to the controlling member 4 to abut against and position the controlling member 4 in the second position; when the locking member 5 is in the released position, the abutting portion 51 is non-interferable with the controlling member 4. In other embodiments, the locking member 5 may be pivoted to the shell body 21, but not limited thereto.

It is to be noted that one of the abutting portion 51 and controlling portion 4 has a protrusion 511, the other of the abutting portion 51 and controlling portion 4 has a tilted face 431, in this embodiment, the tilted face 431 is disposed on the actuating portion 43 of the controlling member 4, when the locking member 5 slides from the released position toward the locked position, the protrusion 511 is abutted against the tilted face 431 and slides relative to the tilted face 431 to make the controlling member 4 move to the second position, so the user does not need to press the controlling member 4, s/he can move the locking member 5 to press the controlling member 4 to the second position (as shown in FIGS. 9 and 10).

More specifically, the abutting portion 51 extends on the locking member 5 along a direction lateral to a sliding direction of the locking member 5, the abutting portion 51 includes a first end 512 and a second end 513 which are located on the sliding direction of the locking member 5, the first end 512 extends toward a direction away from the controlling member 4 to prevent the first end 512 from biasing the controlling member 4 to the second position, the protrusion 511 is disposed on the second end 513, and the first end 512 can increase the structure strength of the second end 513 to make the abutting portion 51 more durable.

In this embodiment, the shell body 21 includes two shell members 211 which are engaged with each other, the two shell members 211 are sleeved on the rod portion 1, each of the two shell members 211 has a through hole 23, the locking member 5 is slidably disposed through the two through holes 23, the locking member 5 has at least one flange 52 radially thereon, the at least flange 52 is between the two shell members 211, the at least one flange 52 is greater than each said through hole 23 in radial dimension to prevent the locking member 5 from being disengaged with the two shell members 211 from the through hole 23, a length of the locking member 5 along the sliding direction is greater than a distance between the two through holes 23, so the locking member 5 can project beyond the shell member 211 for the user to press thereon. Preferably, the through hole 23 is an elongate hole, and the locking member 5 corresponds to the through hole 23 in shape to prevent the locking member 5 from rotating relative to the two shell members 211 and being non-abutted against the controlling member 4. The locking member 5 has two flanges 52 which are spacingly arranged radially thereon, and the two flanges 52 are respectively by two sides of the abutting portion 51 to restrict a sliding distance of the locking member 5. The locking member 5 is disposed through the controlling portion 2, and the locking member 5 is linearly movable. The controlling member 4 further includes two wings 44 projecting oppositely on opposing faces of the controlling member 4 in a thickness direction of the controlling member 4, and the two wings 44 are located outside the shell body 21 and abuttable against the shell body 21.

Given the above, with the gardening machine, the user can position the controlling member in the second position via the locking member, s/he does not have to press the controlling member to actuate the machine tool head to operate. In this way, the burden to the user's fingers becomes less, and the user can change the position of holding the gardening machine to prevent his/her other body parts from getting uncomfortable due to maintaining the same position. Therefore, it would be easier for the user to use the gardening machine, and it helps to improve the working efficiency and prevent occupational injury.

While we have shown and described various embodiments in accordance with the present invention, it should be clear to those skilled in the art that further embodiments may be made without departing from the scope of the present invention.

What is claimed is:

1. A gardening machine, including:
  a rod portion, having a machine tool head;
  a controlling portion, disposed on the rod portion;
  a switch assembly, including a controlling member, the controlling member disposed on the controlling portion and movable to be in a first position or a second position, wherein when the controlling member is in the first position, the controlling member does not actuate the machine tool head, when the controlling member is in the second position, the controlling member actuates the machine tool head to operate;
  a locking member, disposed on the controlling portion and movable to be in a locked position or a released position, wherein when the locking member is in the released position, the controlling member is movable toward the first position, when the locking member is in the locked position, the controlling member is restricted and positioned in the second position;

wherein the controlling member includes a pivot portion, the pivot portion is pivoted to a shell body of the controlling portion to allow the controlling member to swing between the first position and the second position;

wherein the locking member is slidably disposed on the shell body, the locking member has an abutting portion, when the locking member is in the locked position, the abutting portion corresponds to the controlling member to abut against and position the controlling member in the second position; when the locking member is in the released position, the abutting portion is non-interferable with the controlling member;

wherein the locking member is disposed through the controlling portion, and the locking member is linearly movable;

wherein the abutting portion has a protrusion, the controlling member has a tilted face, and when the locking member slides from the released position toward the locked position, the protrusion is abutted against the tilted face and slides relative to the tilted face to make the controlling member move to the second position;

wherein the controlling member further includes two wings projecting oppositely on opposing faces of the controlling member in a thickness direction of the controlling member, and the two wings are located outside the shell body and abuttable against the shell body.

2. The gardening machine of claim 1, wherein the controlling member further includes a pressing portion and an actuating portion, the pivot portion is integrally connected to and between the pressing portion and the actuating portion, a part of the pressing portion projects beyond the shell body, the switch assembly further includes a microswitch, the microswitch is electrically connected to the machine tool head, when the controlling member is in the first position, the actuating portion is non-abutted against the microswitch, and when the controlling member swings to the second position, the actuating portion is abutted against the microswitch to trigger the machine tool head to operate.

3. The gardening machine of claim 1, wherein the switch assembly further includes an elastic member, and the elastic member is respectively abutted against and between the controlling member and the shell body to make the controlling member have a tendency to swing toward the first position.

4. The gardening machine of claim 3, wherein the pivot portion is sleeve-shaped, the elastic member is a torsion spring and received within the pivot portion, the shell body has a shaft, and the elastic member and the pivot portion are sleeved on the shaft.

5. The gardening machine of claim 1, wherein the abutting portion extends on the locking member along a direction lateral to a sliding direction of the locking member, the abutting portion includes a first end and a second end which are located on the sliding direction of the locking member, the first end extends toward a direction away from the controlling member, and the protrusion is disposed on the second end.

6. The gardening machine of claim 1, wherein the shell body includes two shell members which are engaged with each other, each of the two shell members has a through hole, the locking member is slidably disposed through the two through holes, the locking member has at least one flange radially thereon, the at least flange is between the two shell members, the at least one flange is greater than each said through hole in radial dimension, and a length of the locking member along the sliding direction is greater than a distance between the two through holes.

7. The gardening machine of claim 5, wherein the controlling member includes a pressing portion and an actuating portion, the pivot portion is integrally connected to and between the pressing portion and the actuating portion, a part of the pressing portion projects beyond the shell body, the switch assembly further includes a microswitch, the microswitch is electrically connected to the machine tool head, when the controlling member is in the first position, the actuating portion is non-abutted against the microswitch, and when the controlling member swings to the second position, the actuating portion is abutted against the microswitch to trigger the machine tool head to operate; the switch assembly further includes an elastic member, and the elastic member is respectively abutted against and between the controlling member and the shell body to make the controlling member have a tendency to swing toward the first position; the pivot portion is sleeve-shaped, the elastic member is a torsion spring and received within the pivot portion, the shell body has a shaft, and the elastic member and the pivot portion are sleeved on the shaft; the shell body includes two shell members which are engaged with each other, each of the two shell members has a through hole, the locking member is slidably disposed through the two through holes, the locking member has at least one flange radially thereon, the at least flange is between the two shell members, the at least one flange is greater than each said through hole in radial dimension, and a length of the locking member along the sliding direction is greater than a distance between the two through holes; the two shell members are sleeved on the rod portion; the microswitch is located outside of the rod portion and has at least one wire which enters into the rod portion and is electrically connected to the machine tool head; the through hole is an elongate hole, and the locking member corresponds to the through hole in shape; the locking member has two flanges which are spacingly arranged radially thereon, and the two flanges are respectively by two sides of the abutting portion; the tilted face is disposed on the actuating portion of the controlling member; the pivot portion has a slot radially thereon, one of two ends of the elastic member is inserted into the shell body, and the other of the two ends of the elastic member radially extends beyond the pivot portion from the slot to be abutted against the controlling member.

\* \* \* \* \*